UNITED STATES PATENT OFFICE.

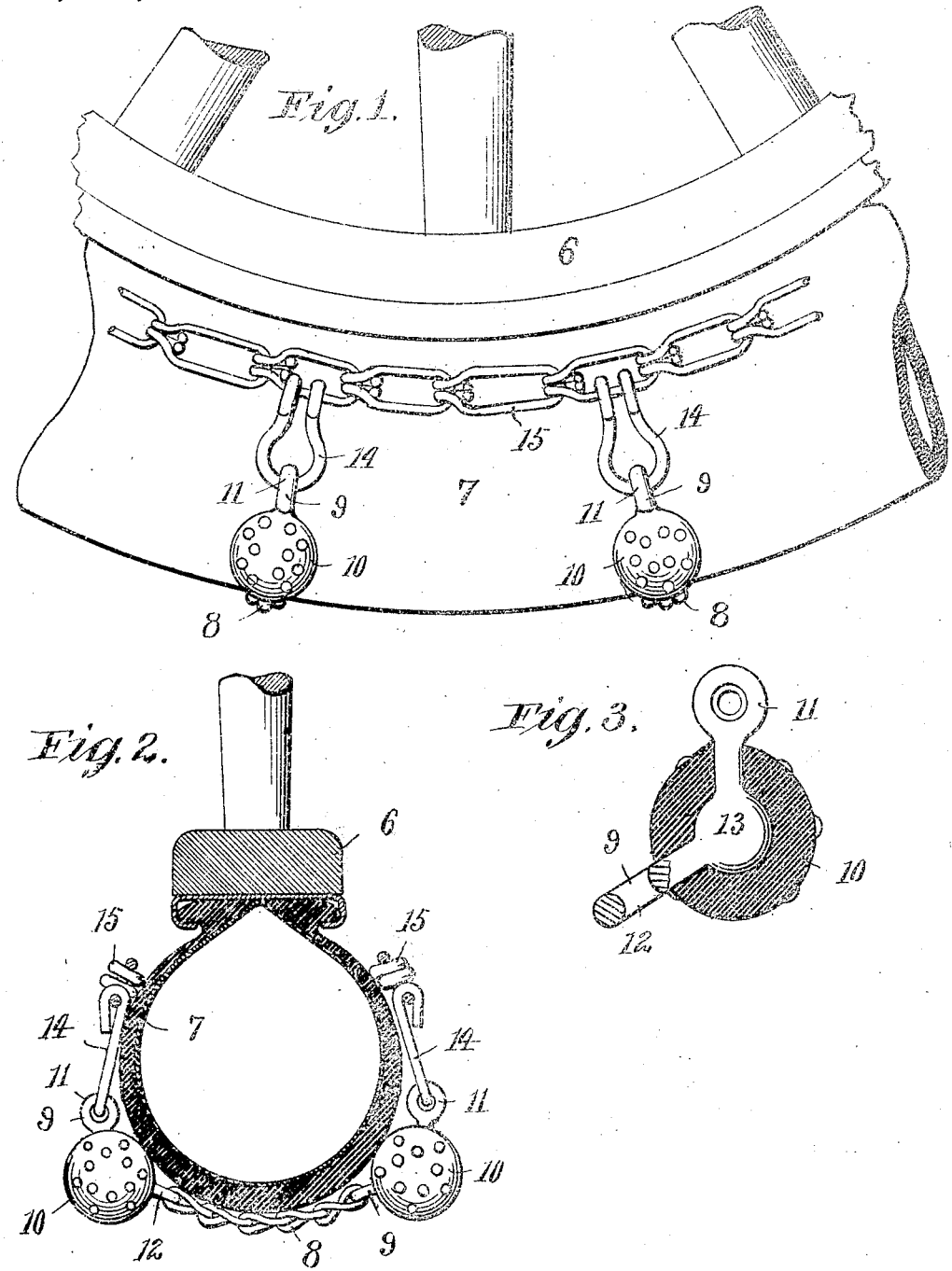

TURNER W. SIMMONS, OF BRIDGEPORT, CONNECTICUT, ASSIGNOR OF ONE-SIXTH TO WILLIAM C. BOWERS, OF BRIDGEPORT, CONNECTICUT.

ANTISKIDDING DEVICE.

1,042,722.    Specification of Letters Patent.    Patented Oct. 29, 1912.

Application filed November 24, 1911. Serial No. 662,146.

*To all whom it may concern:*

Be it known that I, TURNER W. SIMMONS, citizen of the United States, and resident of Bridgeport, in the county of Fairfield and State of Connecticut, have invented certain new and useful Improvements in Antiskidding Devices, of which the following is a specification.

My invention relates to attachable antiskidding devices for pneumatic tire wheels and is distinguished by the embodiment of special means which serves to block in between the road bed and side of the tire tread to hold the wheel against sidewise movement.

The object of the invention is therefore, to provide means that will be brought to bear upon the side of the tread portions of a tire, where the greater strain or thrust of the load comes with the application of the brakes of a car and the tendency of the wheels to move sidewise; to accomplish this result in a simple and efficient manner, and so that its application will not materially injure the tire to which it is applied, or make a noise while in use.

With these and other objects in view the invention resides and consists in the construction and novel combination and arrangement of parts hereinafter fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1, shows a side elevation of a part of a pneumatic tire wheel with my improved anti-skidding device applied thereto. Fig. 2, is a cross section through the wheel, rim and tire, showing the attached anti-skidding device, illustrated in Fig. 1. Fig. 3, shows an enlarged vertical longitudinal cross section of the enlarged link employed in the cross chains to engage the side of the tread portions of the tire.

The device may obviously be carried into effect in connection with various forms of holding means and may be made singly, or connected in series as shown in the drawing where it is illustrated in connection with holding or supporting chains of simple construction which in practice would be detachably connected to the wheel and tire in any suitable or preferred manner.

Referring in detail to the characters of reference marked upon the drawings 6 represents the wheel and 7 a common form of pneumatic tire attached thereto. My improved anti-skidding members are secured to cross pieces 8 that may be made in the form of short chains as shown, that extend across the face or tread of the tire and also serve to prevent the skidding of the wheel. The links of such cross chains as at present used are of a uniform size which results in the chains crowding in under the tire tread, or in other words, in a tendency of the tires to roll over upon the chains and the entire connected parts slipping more or less. The ends of my cross chains are shown connected to specially formed links 9 which include an enlargement or ball 10 formed upon the link and of different material as shown in Fig. 3. These links thus constitute the main antiskidding members and are preferably in the form of an elbow having its two eyes 11 and 12 disposed at an angle to each other while the enlargement 13 is arranged between the said eyes. The one eye 12 is designed for the attachment of the end links of the cross tread chains 8 while to the outwardly disposed eye is secured a link 14 that connects with a suitable annular member 15 arranged upon the opposite side of the tire and made connectible to permit the device to be detachably connected.

The enlarged link 8 which I have termed the block-skidding feature is arranged upon the opposite sides or quarters of the tread portion of the tire so their outer surface does not normally extend out to the face of the tread, but is brought down upon the road bed when a load is put upon the wheel and in such a way as to form a block against sidewise movement of the tire.

Having thus described my invention what I claim and desire to secure by Letters Patent is:—

1. In an anti-skidding device the combination with suitable supporting means, of side links having eyes in each end and having a central enlargement intermediate of the said eyes and a spherical rubber covering on the central enlargement of said link.

2. In an anti-skidding device the combination with suitable supporting means, of side links with eyes disposed at an angle to each other and having a central enlargement at the apex of the angle, and a spherical rubber covering on the central enlargement of said link.

3. In a tire anti-skidding device, the combination with suitable supporting means, of attached links having two eye portions, a flexible ball covering arranged intermediate of the said eyes, and means for holding said ball covered links against the side tread portion of a tire.

4. In an anti-skidding device, the combination of a pair of side links having flexible balls formed thereon to engage the opposite side tread portions of a tire, means for supporting said links upon the tire, and means extending across the tread of the tire for connecting the two said links.

5. In an anti-skidding device the combination of flexible round rubber balls arranged adjacent to the two side tread portions of a tire, and means for supporting the balls in position.

Signed at Bridgeport, in the county of Fairfield and State of Connecticut, this 23d day of November, A. D. 1911.

TURNER W. SIMMONS.

Witnesses:
C. M. NEWMAN,
RUTH M. WORDEN.